(12) United States Patent
Sendelius et al.

(10) Patent No.: US 12,521,677 B2
(45) Date of Patent: Jan. 13, 2026

(54) METHOD FOR CONTROLLING WATER PURIFICATION, AND A WATER PURIFICATION APPARATUS

(71) Applicants: BAXTER INTERNATIONAL INC., Deerfield, IL (US); BAXTER HEALTHCARE SA, Glattpark (CH)

(72) Inventors: Peter Sendelius, Staffanstorp (SE); Henrik Lindgren, Genarp (SE); Carl-Henry Örndal, Eslöv (SE)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 856 days.

(21) Appl. No.: 17/639,493

(22) PCT Filed: Sep. 4, 2020

(86) PCT No.: PCT/EP2020/074759
§ 371 (c)(1),
(2) Date: Mar. 1, 2022

(87) PCT Pub. No.: WO2021/043974
PCT Pub. Date: Mar. 11, 2021

(65) Prior Publication Data
US 2022/0305441 A1    Sep. 29, 2022

(30) Foreign Application Priority Data
Sep. 5, 2019   (SE) ..................... 1951009-8

(51) Int. Cl.
*B01D 61/12*   (2006.01)
*C02F 1/44*   (2023.01)

(52) U.S. Cl.
CPC ............. *B01D 61/12* (2013.01); *C02F 1/441* (2013.01); *B01D 2311/246* (2013.01);
(Continued)

(58) Field of Classification Search
CPC .... B01D 61/02; B01D 61/025; B01D 61/026; B01D 61/00; B01D 61/0024; B01D 61/12;
(Continued)

(56) References Cited

U.S. PATENT DOCUMENTS 9,370,746 B2    6/2016   Manabe et al.
2013/0068674 A1  3/2013  Manabe et al.
(Continued)

FOREIGN PATENT DOCUMENTS

CN    108380051 A    8/2018
EP     0599281 A2    6/1994
(Continued)

OTHER PUBLICATIONS

Lundberg et al., Department of Automatic Control, ISSN: 0280-5316, added to LUP on Aug. 30, 2019 (Year: 2019).*
(Continued)

*Primary Examiner* — Allison G Fitzsimmons
(74) *Attorney, Agent, or Firm* — K&L Gates LLP

(57) ABSTRACT

A method for controlling water purification, and a water purification apparatus (1). The apparatus (1) comprises a reverse osmosis membrane (3a) configured to receive feed water from a feed pump (5), and to produce permeate water and reject water. The method comprises measuring (S1) a property indicative of an inlet water quality $C_{inlet}$ of inlet water to the feed pump (5), and determining (S2) a target recovery for the water purification based on the property indicative of the inlet water quality. The method further comprises controlling (S3) a feed pump speed to a predetermined speed, or to a speed determined based on a relation between the feed pump speed, the inlet water quality $C_{inlet}$ and a target permeate water quality $C_{per}$, based on the inlet water quality. The method comprises measuring (S4) a
(Continued)

property indicative of a product water flow rate $Q_{prod}$, wherein the product water is permeate water that is delivered for consumption, recirculating (S5) a first portion of the reject water, and controlling (S6) a drain flow rate $Q_{drain}$ to drain, from a second portion of the reject water, to accomplish the target recovery based on the product water flow rate $Q_{prod}$.

10 Claims, 4 Drawing Sheets

(52) U.S. Cl.
CPC .. *B01D 2311/2512* (2022.08); *B01D 2313/18* (2013.01); *B01D 2313/243* (2013.01); *C02F 2209/001* (2013.01); *C02F 2209/005* (2013.01); *C02F 2209/05* (2013.01); *C02F 2209/40* (2013.01); *C02F 2301/046* (2013.01)

(58) Field of Classification Search
CPC .... B01D 61/08; B01D 61/22; B01D 2311/24; B01D 2311/243; B01D 2313/70; B01D 2313/701; B01D 2313/90; B01D 2313/903; B01D 2315/00; B01D 2315/20; B01D 2315/22
See application file for complete search history.

(56) References Cited

U.S. PATENT DOCUMENTS

| 2013/0126430 A1 | 5/2013 | Kenley et al. |
| 2016/0362305 A1 | 12/2016 | Ohtsuki et al. |

FOREIGN PATENT DOCUMENTS

| EP | 1240938 A1 | 9/2002 |
| WO | 2004054691 A1 | 7/2004 |
| WO | 2012069892 A3 | 5/2012 |
| WO | 2019141724 A1 | 7/2019 |

OTHER PUBLICATIONS

International Search Report from International Patent Application No. PCT/EP2020/074759, mailed Nov. 26, 2020.
Written Opinion from International Patent Application No. PCT/EP2020/074759, mailed Nov. 26, 2020.

* cited by examiner

METHOD FOR CONTROLLING WATER PURIFICATION, AND A WATER PURIFICATION APPARATUS

PRIORITY CLAIM

The present application is a National Phase of International Application No. PCT/EP2020/074759, filed Sep. 4, 2020, which claims priority to SE Application No. 1951009-8, filed Sep. 5, 2019. The entire contents of each application are incorporated herein by reference and relied upon.

TECHNICAL FIELD

The present disclosure relates to the field of water purification by means of reverse osmosis.

BACKGROUND

Reverse osmosis, RO, is a commonly used technology for water purification. RO makes use of a membrane, where water to be purified is pushed through the membrane to create purified, permeate water. The membrane is semipermeable, and allows passage of water but retains most of dissolved salts, particles, bacteria and endotoxin in a concentrated solution. The concentrated solution is passed to drain, or recirculated to reduce water consumption. The purification efficiency can be calculated as impurity removal from feed water rate in percent.

The produced permeate water may be used directly for certain applications, or may need further purification to fulfill high requirements on purity. In both cases, it is desired to know and to have control of the degree of purification of the permeate water, to accurately meet application demands or demands stipulated by more downstream purification steps receiving the permeate water. The water to be purified is for example tap water. The quality of the tap water may vary from one location to another, and also from time to time, thereby challenging the control of the purification process. Also, in some locations, the water is a scarce resource, and its use has to be handled with care.

SUMMARY

It is an objective of the disclosure to provide water purification with a stable water quality output for varying quality of the water input. It is a further objective to provide a stable water quality with low water consumption. It is a further objective to provide a stable water quality to a low cost.

These objectives and others are at least partly achieved by the method according to the first aspect, and by the apparatus according to the second aspect, and by the embodiments according to the dependent claims.

According to one aspect, the disclosure relates to a method for controlling water purification of a water purification apparatus. The water purification apparatus comprises a reverse osmosis membrane configured to receive feed water from a feed pump, and to produce permeate water and reject water. The method comprises: measuring a property indicative of an inlet water quality $C_{inlet}$ of inlet water to the feed pump and determining a target recovery for the water purification based on the property indicative of the inlet water quality. The method further comprises controlling a feed pump speed to a predetermined speed, or to a speed determined based on a relation between the feed pump speed, the inlet water quality $C_{inlet}$ and a target permeate water quality $C_{per}$, based on the inlet water quality $C_{inlet}$. The method further comprises measuring a property indicative of a product water flow rate $Q_{prod}$, wherein the product water is permeate water that is delivered for consumption. The method further comprises recirculating a first portion of the reject water, and controlling a drain flow rate $Q_{drain}$ to drain, from a second portion of the reject water, to accomplish the target recovery based on the product water flow rate $Q_{prod}$.

The method provides water purification with a stable water quality output, thus the quality of the permeate water, for varying quality of the water input, thus, the inlet water. By controlling the recovery and the speed of the feed pump, the working point of the water purification may be adapted according to different qualities of the inlet water, to continuously provide a stable water quality output, without manual intervention. Thereby a water production may be achieved that automatically adapts its production according to different input water qualities. The water purification apparatus is thereby easy to use at different locations, or at the same location but with different input water sources, without needing re-configuration of the water production. Thereby, the quality of the installation becomes less dependent upon the skill and experience of the installer. The recovery is controlled based on the quality of the input water and the product water flow rate, whereby the water consumption can be controlled, and thus kept low. Further, the feed pump speed is controlled to a working point where it is operated efficiently to a low cost, or to a feed pump speed that supports maintaining the target recovery and still produce permeate water with a stable water quality, based on the inlet water quality.

According to some aspects, the controlling comprises estimating a drain flow rate $Q_{drain}$ needed to accomplish the target recovery, based on the product water flow rate $Q_{prod}$, and controlling the drain flow rate to the estimated drain flow rate $Q_{drain}$. Thus, thereby the recovery may be controlled to the target recovery.

According to some aspects, the method comprises determining the target recovery with a limitation that a permeate water quality $C_{permeate}$ is maintained at a predetermined permeate water quality, or within a predetermined permeate water quality interval. Thus, the target recovery may be changed for varying inlet water qualities, such that the predetermined permeate water quality still can be achieved.

According to some aspects, the method comprises re-circulating a portion of the permeate water from a recirculation point to the inlet water. Thereby excess permeate water can be reused.

According to some aspects, the recirculating comprises measuring a property indicative of the flow rate $Q_{prod}$ of a product water downstream the recirculation point of the permeate water, and controlling the re-circulation in order to meet a product water flow rate criterion. Thereby a predetermined flow rate of the product water can be achieved.

According to some aspects, the relation between the feed pump speed, the inlet water quality $C_{inlet}$ and the target permeate water quality $C_{per}$ is a predetermined relation that gives a feed pump speed needed to produce permeate water with the target permeate quality, at the inlet water quality $C_{inlet}$ and the target recovery. Thus, the feed pump speed needed to cope for a changed inlet water quality may be estimated, at the estimated inlet water quality and while achieving the target recovery.

According to some aspects, the controlling the feed pump comprises controlling the feed pump speed to a predetermined speed while the inlet water quality $C_{inlet}$ is within an interval, and controlling the feed pump speed based on the relation between the feed pump speed, the inlet water quality $C_{inlet}$ and a target permeate water quality $C_{per}$ while the inlet water quality $C_{inlet}$ is outside the interval. Thereby a robust control of the feed pump may be achieved. The predetermined speed is for example a predetermined constant speed. The interval is for example a middle interval, between a lower interval and an upper interval of the inlet conductivity. The middle interval may directly follow the lower interval, and the upper interval may directly follow the middle interval.

According to some aspects, the measuring a property indicative of an inlet water quality $C_{inlet}$ comprises measuring a conductivity of the inlet water, conductivity of the feed water or conductivity of the permeate water. Thus, the conductivity may indicate the quality of the water. Further, the quality of the inlet water may be directly measured in the inlet water, or derived from another quality measurement of the feed water or the permeate water.

According to some aspects, the method comprising estimating an initial drain flow rate $Q_{initial\_drain}$ through a drain valve used for passing reject water to the drain, when the drain valve is fully open to drain, and wherein the controlling comprises estimating a proportion the drain valve should be open towards drain, based on the initial drain flow rate $Q_{initial\_drain}$ and the estimated drain flow rate $Q_{drain}$, and controlling the drain valve based on the estimated proportion. Thereby a drain valve control value for achieving the target recovery can be derived automatically for various types of drain valve, independent of the wear of the same.

According to some aspects, the predetermined speed is a nominal speed of the feed pump. Thereby the feed pump may be operated at a working point where it is known to work efficiently.

According to a second aspect, the disclosure relates to a water purification apparatus comprising a fluid path, a feed pump configured to receive inlet water, and to provide feed water, a reverse osmosis-, RO, membrane, wherein the RO-membrane is configured to receive feed water from the feed pump, and to produce permeate water and reject water. The apparatus further comprises a quality sensor configured to measure a property indicative of an inlet water quality $C_{inlet}$ and a flow rate sensor configured to measure a property indicative of the product water flow rate $Q_{prod}$, wherein the product water is permeate water that is delivered for consumption. The apparatus further comprises a recirculation path configured to recirculate a first portion of the reject water, and a drain valve configured to regulate a drain flow rate $Q_{drain}$ to a drain, from a second portion of the reject water. The apparatus further comprises a control arrangement. The control arrangement is configured to obtain the property indicative of the inlet water quality $C_{inlet}$ and to determine a target recovery for the water purification based on the inlet water quality. The control arrangement is further configured to control the feed pump speed of the feed pump to a predetermined speed, or to a speed determined based on a relation between the feed pump speed, the inlet water quality $C_{inlet}$ and a target permeate water quality $C_{per}$, based on the inlet water quality $C_{inlet}$ and to control the drain flow rate $Q_{drain}$ of the drain valve to drain, to accomplish the target recovery based on the product water flow rate $Q_{prod}$.

The same positive effects may be achieved with the apparatus as with the method.

According to a third aspect, the disclosure relates to a computer program comprising instructions to cause the water purification apparatus according to the second aspect, to execute any of the steps of the method according to the first aspect.

According to a fourth aspect, the disclosure relates to a computer-readable medium having stored thereon the computer program of the third aspect.

DETAILED DESCRIPTION

Figure 1:
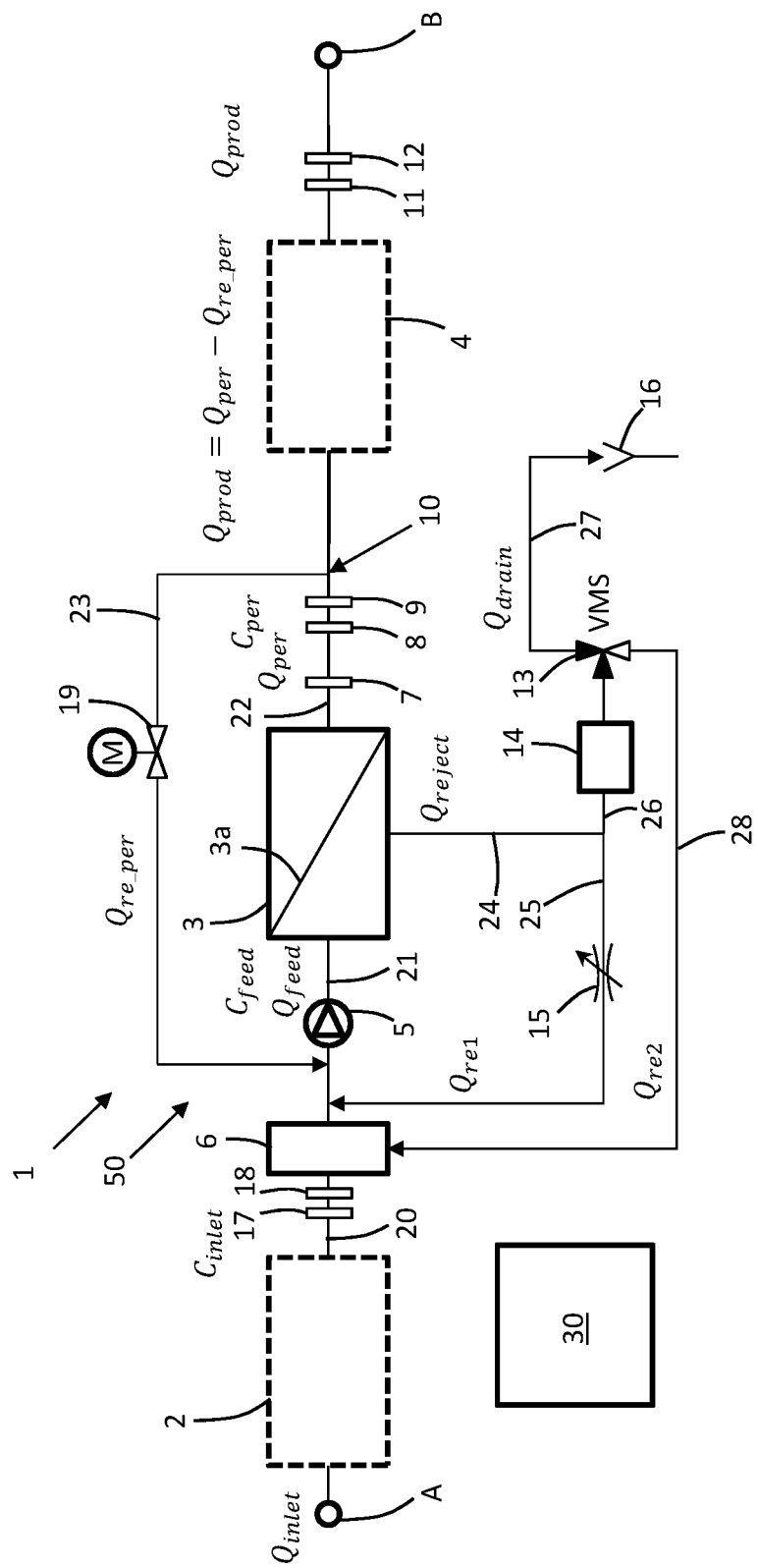
FIG. 1 illustrates a water purification apparatus according to a first embodiment.

In the following methods for purification of water and water purification apparatuses will be described, that provide a stable quality of the purified water for varying qualities of the inlet water, while having high recovery. "Recovery" may also be referred to as "water efficiency".

The inlet water is purified using reverse osmosis, RO. Before the inlet water is treated with RO, it may be pretreated in a pretreatment module to remove, for example, greater particles and chlorine. The purified water from the RO process may be directly delivered for consumption, or further treated in a posttreatment module before it is delivered for consumption, depending on requirement on the quality of the purified water. In any case, it is desired that a consistent water quality can be delivered, that meets requirements from a consumption perspective, or requirements from devices further downstream the RO, such that they can deliver purified water with a desired quality without compromising with the performance of the same.

The working point of the reverse osmosis process sets the efficiency of the purification with regards to rejection rate, recovery and power consumption. The pressure over the membrane is correlated with the permeate flow rate, thus, generally, a high pressure gives a high permeate flow rate. The permeate flow rate thus changes with the pressure over the membrane. The permeate flow rate is also dependent on the quality of the water being fed to the reverse osmosis process. Parameters of the water which effects the permeate flow rate are, for example, conductivity and hardness. A high conductivity decreases the permeate flow rate, as the feed water contains more particles that stops the water from penetrating the membrane and thus increases the osmotic pressure. Also, a high hardness decreases the permeate flow rate, as the feed water contains more calcium that adds on to scaling on the membrane.

The inlet water quality may vary, depending on the location and time of year. The water purification described herein is performed based on the quality of the inlet water, such that a target permeate water quality is achieved, while no more water than necessary is passed to drain during the RO procedure. Different qualities of the inlet water may require different pressures over the membrane and different recovery to get a targeted permeate water quality. Recovery is controlled such that when the inlet water quality is high, less water is passed to drain, compared to when the inlet water quality is low. A feed pump is pumping feed water to the membrane, and the feed pump may be controlled to a working point where it works most efficiently. Thereby purified water can be produced to a low cost. As the feed pump at the working point where it works most efficiently, mostly also has a low noise level, the amount of noise to the surrounding can be kept low. When the quality of the inlet water is low, the feed pump speed may be increased to increase the pressure over the membrane, and such that less water needs to be passed to drain, to achieve the target permeate quality.

In the following, different embodiments of a water purification apparatus will be described, that controls water purification based on the quality of the inlet water. Thereafter methods for producing purified water will be described, for example using any of the water purification apparatuses described below.

FIG. 1 illustrates a water purification apparatus 1 according to a first embodiment. The water purification apparatus 1 comprises a fluid path 50, a RO-unit 3 including a RO-membrane 3a, and a feed pump 5. The feed pump 5 receives inlet water from an inlet point A with a flow rate $Q_{inlet}$, for example from a tap, tank or similar. An inlet path 20 connects the inlet point A with the feed pump 5. It should be understood that a "path" as used herein may include one or several fluid lines or paths. The fluid path 50 thus includes one or several of the fluid paths of the apparatus 1, that will be described in the following. The inlet water may be pretreated in a pretreatment module 2, upstream the feed pump 5. The pretreatment module includes, for example, a mechanical filter for removing particles and/or one or several carbon beds for removing chlorine or chloramine. The inlet water quality is measured with a first quality sensor 17 configured to measure a property indicative of an inlet water quality $C_{inlet}$. The first quality sensor 17 is for example a conductivity cell, arranged to measure the conductivity of the inlet water. A first temperature sensor 18 is arranged to measure the temperature of the inlet water, to temperature compensate the measurement of the inlet conductivity. A tank 6, or other kind of vessel or container, may be arranged to collect the inlet water, pretreated or not pretreated. The first quality sensor 17 and the first temperature sensor 18 are arranged to the inlet path 20 downstream any pretreatment module 2, but upstream the feed pump 5. The tank 6 is arranged downstream the first quality sensor 17 and the first temperature sensor 18.

The feed pump 5 is configured to provide a flow of feed water from the inlet water. The feed pump 5 is for example a magnet drive rotary vane pump. The feed pump 5 is arranged to be controlled to a certain speed, i.e. revolutions per minute (RPM), and is powered from a power source (not shown), e.g. a battery or power network. The power used by the feed pump 5 may be continuously monitored, e.g. by monitoring the current or power consumed by or transmitted to the feed pump 5. The RO-unit 3, and thus the RO-membrane 3a, is configured to receive feed water from the feed pump 5, and to produce permeate water and reject water from the feed water. A feed path 21 connects the feed pump 5 and a feed inlet of the RO-unit 3, to transport the flow of feed water to the RO-unit 3. A permeate path 22 connects a permeate outlet of the RO-unit 3 with a consumption point B. The permeate water is passed from the RO-unit 3 to the consumption point B in the permeate path 22. In some embodiments, the permeate water is further treated in a posttreatment module 4, before it is delivered for consumption at the consumption point B. The posttreatment module 4 comprises for example a polisher. The polisher may include a deionizer, for example using electrodeionization (EDI), capacitive deionization (CDI), electrodialysis reversal (EDR), or include an ion exchange resin bed or a mixed bed resin. In some embodiments, the polisher is configured to treat the permeate water such that it meets quality requirements for water for injection with a conductivity of 1.3 µS/cm.

The purified water from posttreatment module 4 may be referred to as product water. The product water is passed to the consumption point B for collection, further transportation or use by another application. If the posttreatment module 4 is not present, the permeate water that leaves the RO-unit 3 and is passed to the consumer point B, is referred to as product water.

A flow rate sensor 7 is configured to measure a property indicative of the permeate water flow rate $Q_{per}$. A second quality sensor 8 is configured to measure a property indicative of a permeate water quality $C_{per}$. The second quality sensor 8 is for example a conductivity cell, arranged to measure the conductivity of the permeate water. As will be explained in the following, the measurement with the second quality sensor 8 may also be indicative of the quality of the inlet water. A second temperature sensor 9 is arranged to measure the temperature of the permeate water, to temperature compensate the measurement of the permeate water conductivity.

The rejection rate of the RO-unit 3 is calculated as:

$$\text{Rejection rate} = 1 - \frac{\text{concentration in permeate water}}{\text{concentration in feed water}} \quad (1)$$

A typical rejection rate for the RO-unit 3 for NaCl is around 98% (0.98), other substances have different rejection rates. The concentration in the permeate water is for example measured using the second quality sensor 8. The concentration of the feed water may be derived from the inlet water conductivity, and by using the recovery and mass balance equations.

In some embodiments, the apparatus 1 comprises a permeate recirculation path 23 arranged to recirculate permeate water. The permeate recirculation path 23 is arranged between a recirculation point 10 located in the permeate path 22, and the inlet path 20. The permeate recirculation path 23 thus connects the permeate path 22 and the inlet path 20. The recirculation point 10 is located in the permeate path 22 downstream the permeate flow rate sensor 7, and upstream any posttreatment module 4. The permeate recirculation path 23 connects to the inlet path 20 upstream the feed pump 5, and downstream the first quality sensor 17 and downstream the pretreatment module 2, if any. A control device 19 is arranged to control a flow rate of the recirculated permeate water in the permeate recirculation path 23. The control device 19 is for example a controllable valve, e.g. a motorized valve. The apparatus 1 is also provided with a flow rate sensor 11 configured to measure a property indicative of the product water flow rate $Q_{prod}$. The flow rate sensor 11 is arranged to the permeate path 22, downstream the recirculation point 10. The flow rate sensor 11 may be arranged upstream or downstream any posttreatment module 4. The product water is the part of the permeate water that is not recirculated in the permeate recirculation path 23. The product water is thus the water that continues in the permeate path 22, downstream the recirculation point 10. In case the permeate water is post-treated in a posttreatment module 4, the product water is the purified water that is produced by the posttreatment module 4. The control device 19 is controlled based on the measured property indicative of the product water flow rate $Q_{prod}$, such that the product water flow rate $Q_{prod}$ corresponds to a predetermined flow rate. In some embodiments, the apparatus 1 comprises a pressure sensor 12, configured to sense the pressure in the permeate fluid path 22 downstream the recirculation point 10 and downstream any posttreatment module 4. Thus, the pressure sensor 12 monitors the pressure of the product water. The pressure sensor 12 monitors the pressure in the permeate path 22 downstream the recirculation point 10 and downstream any posttreatment module 4, to make sure that the pressure in the permeate path stays within certain limits. The control device 19 may thus also be controlled such that the pressure in the permeate path 22 downstream the recirculation point 10 and downstream any posttreatment module 4 e.g. does not go beyond an upper pressure limit.

In some embodiments, the apparatus 1 comprises a tank 6 arranged in the inlet path 20 upstream the feed pump 5. The permeate recirculation path 23 may then be fluidly connected to the tank 6, and thus recirculate permeate water to the tank 6. The feed pump 5 will then pump water from the tank 6.

The apparatus 1 may comprise a third quality sensor (not shown), configured to measure a property indicative of a product water quality $C_{prod}$. The third quality sensor is for example a conductivity cell, arranged to measure the conductivity of the product water downstream a posttreatment module 4, if present. A third temperature sensor (not shown) may then be arranged to measure the temperature of the product water, to temperature compensate the measurement of the product water conductivity.

A reject path 24 connects the RO-unit 3 with a first recirculation path 25 and a waste path 26. The reject path 24 is connected at one end to a reject outlet of the RO-unit 3, and at the other end to the first recirculation path 25 and the waste path 26. The first recirculation path 25 is connected between the reject path 24 and the inlet path 20. Thus, the first recirculation path 25 is at one end connected to the reject path 24 and at the other end connected to the inlet path 20. The waste path 26 is connected at one end to the reject path 24, and at the other end connected to a drain valve 13. The drain valve 13 is here a three-way valve. A drain path 27 is arranged to guide reject water from the drain valve 13 to a drain 16. The drain path 27 is connected at one end to an outlet of the three-way valve, and is directed to the drain 16 at the other end. A second recirculation path 28 is arranged to guide reject water from the drain valve 13 to the inlet path 20, here the tank 6. The second recirculation path 28 is connected at one end to another outlet of the drain valve 13, and at the other end to the tank 6, or inlet path 20. The drain valve 13 is arranged to selectively direct reject water, that is not recirculated via the first recirculation path 25, to the drain 16 and to the inlet path 20. Thus, reject water is both sent to drain 16 and is recirculated, however, the amounts may be varied.

A recirculation mechanism 15, here a valve such as a variable restriction valve or a manual or motorized needle valve, is arranged to restrict the flow rate in the first recirculation path 25. The recirculation mechanism 15 also makes sure that the feed water does not enter the first recirculation path 25. The RO-membrane recovery is typically set by a technician by configuring the recirculation mechanism 15 (being a valve) such that the RO-membrane recovery becomes a predetermined recovery when the speed of the feed pump 5 is driven at, for example, a nominal speed. The speed of the feed pump 5 then also establishes a basically constant reject flow rate.

Figure 3:
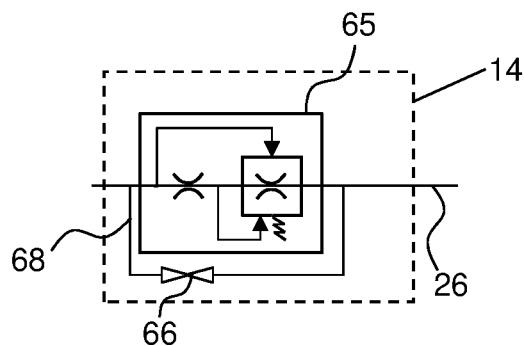
FIG. 3 illustrates a valve device according to some embodiments.

A drain valve arrangement 14 is arranged to the waste path 26 to restrict the flow rate in the waste path 26. FIG. 3 is illustrating one embodiment of the drain valve arrangement 14. The drain valve arrangement 14 in FIG. 3 comprises a flow device 65 that comprises a first flow valve, and a second flow valve downstream the first flow valve. The pressure upstream and downstream the first flow valve regulates the allowed magnitude of the flow rate through the second flow valve. A bypass path 68 is arranged to bypass the flow device 65, and a controllable flow valve 66 (e.g. an on/off valve or a control valve) is arranged to the bypass path 68 to control the flow rate in the bypass path 68.

The apparatus 1 also comprises a control arrangement 30. The control arrangement 30 typically comprises control circuitry such as processor and memory. The processor includes, for example, one or several central processing units (CPUs). The memory includes, for example, one or several memory units. In some embodiments, the memory stores a computer program comprising instructions to cause the apparatus 1 to execute a method for controlling the water purification apparatus 1. Thus, the computer program is stored on a computer-readable medium. The computer program may also be stored on an external memory such as a flash memory, a cloud-based memory or a memory on another computer. The control arrangement 30 also comprises a communication interface, that may be wired or wireless, in order to be able to communicate with components of the apparatus 1 such as sensors, pumps, recirculation mechanism, valves, a user interface etc. The control arrangement 30 is for example configured to receive or collect information such as measured sensor values or data from the described components such as quality sensors, conductivity cells, temperature sensors, flow rate sensors, pressure sensors, pumps, the valve device, valves etc. The control arrangement 30 is also configured to send control signals or control data to the described components such as the feed pump, the drain valve, other valves etc. In some embodiments, the control arrangement 30 is configured to send a control signal or control data to the feed pump 5 indicating a desired speed of the feed pump 5. The feed pump 5 is configured to apply the desired speed upon receipt of the same. In some embodiments, the control arrangement 30 is configured to send a control signal or control data to the drain valve 13 indicating a certain on/off rate, a degree of opening or similar, in order to achieve a certain drain flow rate $Q_{drain}$ to drain. The control arrangement 30 may also include a user interface, such that a user can provide input to the apparatus 1, and monitor the status of the apparatus 1 and the purification process. The control arrangement 30 may be arranged to automatically control the purification process, thus, receive measured signals/data, and make any needed estimation, determination, calculation etc., and thereafter automatically control the components of the apparatus 1 (e.g. feed pump 5, drain valve 13), to control the purification.

Figure 2:
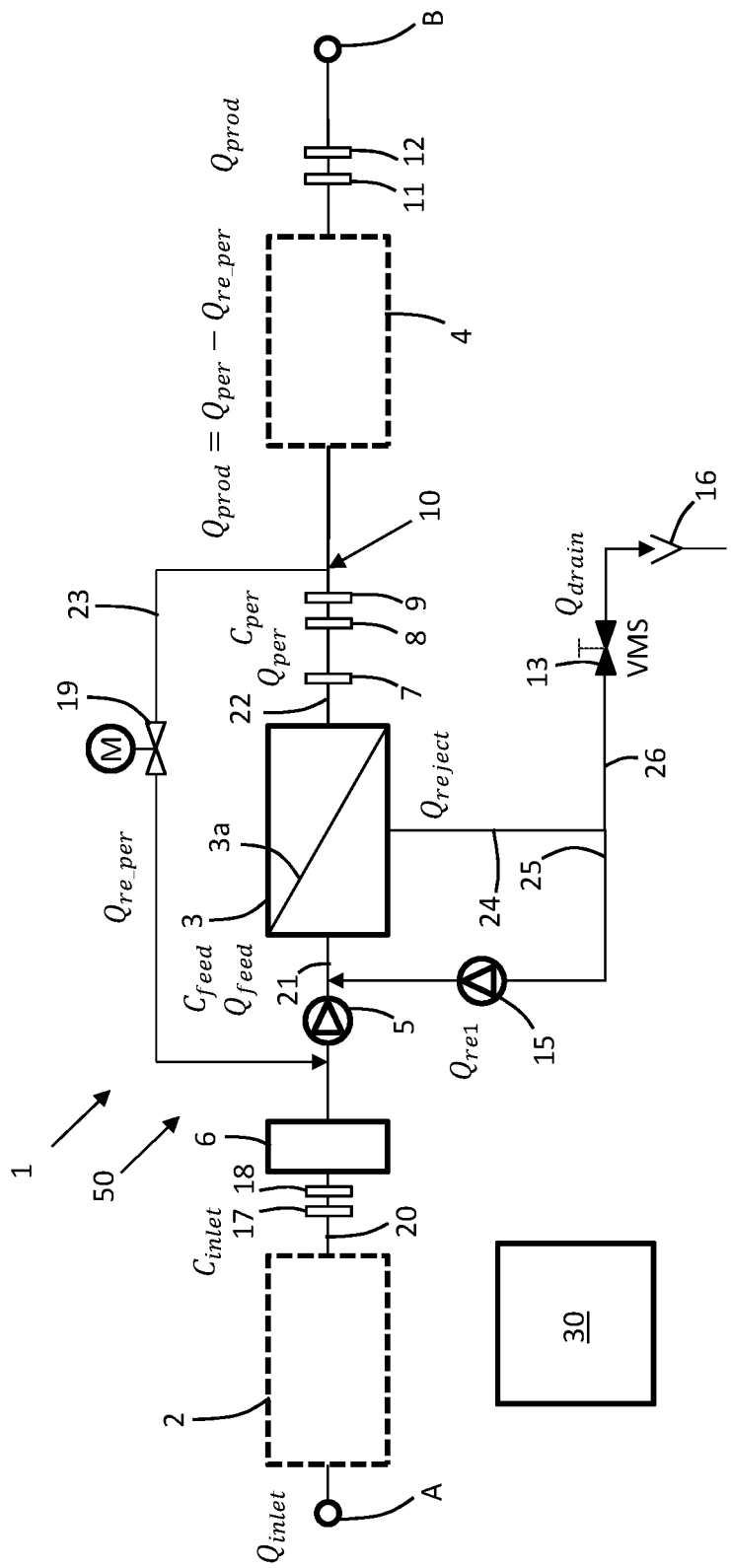
FIG. 2 illustrates a water purification apparatus according to a second embodiment.

FIG. 2 illustrates a water purification apparatus 1 according to a second embodiment. The apparatus 1 according to the second embodiment mainly corresponds to the apparatus 1 according to the first embodiment, and the same parts that are visible in FIG. 1 will not be repeated here. However, as can be seen from FIG. 2, in the second embodiment the first recirculation path 25 is connected between the reject path 24 and the feed path 21, instead of being connected between the reject path 24 and the inlet path 5 as in the first embodiment.

The first recirculation path 25 is thus arranged to recirculate reject water to the feed path 21, to a point in the feed path 21 between the feed pump 21 and the inlet of the RO-unit 3. Also, the recirculation mechanism 15 is here a recirculation pump, instead of a valve. The recirculation pump is for example a magnet drive rotary vane pump. Further, the drain valve 13 is a controllable valve, that is arranged to the waste path 26. The waste path 26 is connected at one end to the reject path 24, and at the other end to drain 16. Hence, in this second embodiment, there is no drain path 27 or second recirculation path 28. The drain valve 13 comprises a controllable flow valve. The controllable flow valve is for example an on/off valve, that is arranged to change position between a fully open position and a fully closed position. The flow rate is controlled e.g. by controlling the frequency of changing state of the on/off valve. I.e. varying the time the on/off valve is open. Alternatively, the controllable flow valve is a motorized controllable flow valve, that is configured to be controlled to several or an infinite number of positions. The controllable drain valve 13 is for example a needle valve or a proportional valve. The drain valve 13 is set to provide a certain flow rate, given a certain pressure.

This setting is for example made at the manufacturing site, at installation or just before production of water is started. The setting may be performed manually or automatically. Later, during production of purified water, if the pressure over the drain valve 13 increases, the flow rate through the drain valve 13 will increase proportionally. Also, if the pressure over the drain valve 13 decreases, the flow rate through the drain valve 13 will decrease proportionally.

By having a recirculation pump (in addition to the feed pump), the net driving pressure, NDP, across the RO-membrane 3a and a reject flow rate may be independently controlled. The feed pump 5 maintains a pressure over the RO-membrane 3a, and the recirculation pump creates the necessary flow rate in the recirculation path 25 to maintain a predetermined RO-membrane recovery rate. Then, the feed pump 5 does not need to be controlled to maintain the RO-membrane recovery rate as in previous systems, instead, the feed pump 5 may be controlled to a certain speed, in order to achieve a certain permeate conductivity. Also, when using such a two-pump system, the energy needed to run the pumps can be lowered compared to having only a feed pump 5 (no recirculation pump). This because the feed pump 5 more easily achieves a high net driving pressure when using two pumps, as the recirculation pump controls the recirculation flow rate. Further, by using two pumps instead of only one feed pump, the noise level is reduced as if using only one pump, the one pump needs to be driven at a higher RPM, and thus produces more noise.

In the first embodiment, thus the one pump approach (with a feed pump 5 but no recirculation pump), the feed pump 5 creates both flow and pressure and these parameters are therefore coupled to each other and cannot be changed independently. The net driving pressure is generated by the resistance in the RO-membrane 3 also in the valve. As a result, the feed pump 5 must deliver a large amount of water to build the pressure needed to push the water through the RO-membrane 3a. By replacing the valve with a recirculation pump, the feed pump 5 can pressurize the recirculation path 25 without a high water flow. As a result, the feed pump 5 can run at a much lower speed. The recirculation pump creates the recirculation flow rate but does not have to generate any pressure since the recirculation path 25 is pressurized by the feed pump 5.

Figure 6:
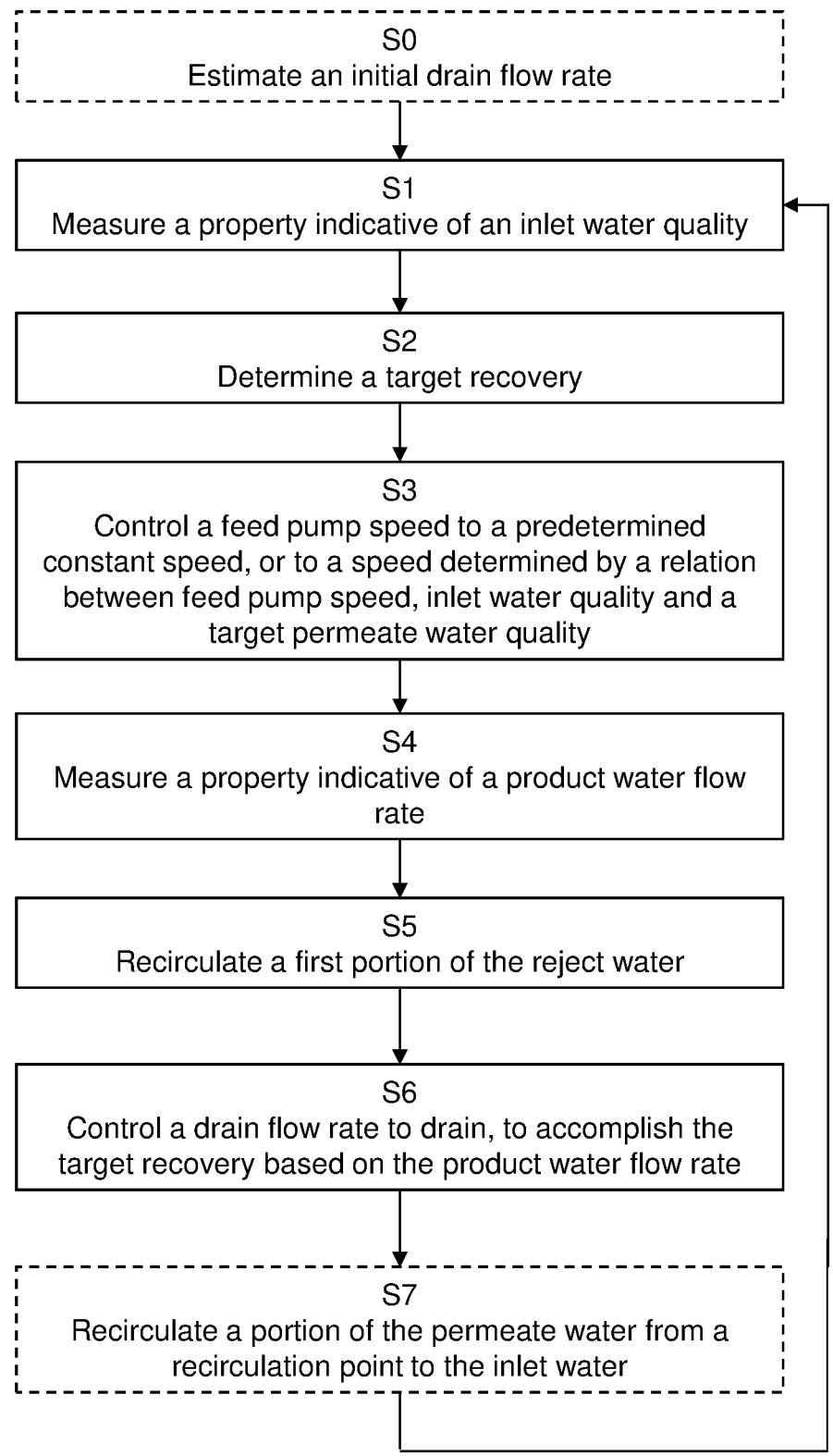
FIG. 6 is a flow chart of a method according to some embodiments of the disclosure.

In the following a method for controlling a water purification apparatus will be described with reference to the flow chart of FIG. 6, for example the water purification apparatus 1 according to any one of the embodiments described with reference to FIGS. 1 to 3. A purpose of the method is to control the water purification apparatus to produce purified water with a predetermined quality in an efficient way, from inlet water with varying quality. The method is typically loaded as a computer program into a memory of a control arrangement 30 of the apparatus 1, and when executed by a processor of the control arrangement 30 of the apparatus 1, makes the apparatus 1 execute the instructions of the computer program. It should be understood that steps of the method may be executed in another order that an order derived from the numbering of the steps, thus, a step indicated with a higher number than another step with a lower number may be executed before, simultaneously as or after the step with the lower number.

Before the method is started, the apparatus 1 is connected to a water source at the connection point A. The water source is e.g. a water tap. The water is turned on, and water is flowing into the inlet path 20 at the connection point A. The water is optionally pretreated in a pretreatment module 2. The method comprises measuring S1 a property indicative of an inlet water quality $C_{inlet}$ of inlet water to the feed pump 5. The property is for example a conductivity measurement of the inlet water, a conductivity measurement of the feed water, or a conductivity measurement of the permeate water. The inlet water quality may thus be measured using a conductivity cell arranged to measure the conductivity of the inlet water or the feed water, e.g. the first quality sensor 17. The quality of the inlet water may be determined by measuring the conductivity of the feed water, and derive the conductivity of the inlet water based on the recovery and mass balance equations. In some embodiments, the conductivity of the feed water is approximately equal to the inlet water conductivity multiplied with rejection rate/(1−recovery rate). The inlet water quality may alternatively be determined using a conductivity cell arranged to measure the conductivity of the permeate water, e.g. the second quality sensor 9. The conductivity of the inlet water $c_{in}$ may then be derived from the conductivity of the permeate water $C_{per}$ by the following relationship:

$$c_{in} = \frac{c_{per}}{(1 - \text{rejection rate})} \cdot (1 - \text{recovery rate}) \cdot \text{rejection rate} \quad (2)$$

The rejection rate in the numerator may be approximated with "1" for NaCl, as it is very close to "1", (approximately 0.98). The measured property is thus indicative of the quality of the inlet water. In other words, the quality of the inlet water is for example related to, or a function of, the measured property. Thus, the measuring S1 a property indicative of an inlet water quality $C_{inlet}$ comprises measuring a conductivity of the inlet water, a conductivity of the feed water or a conductivity of the permeate water. In some embodiments, the step of measuring S1 a property indicative of the inlet water quality includes determining or estimating the inlet water quality based on one or more measurements of the inlet water conductivity, the feed water conductivity and/or the permeate water conductivity.

The method further comprises determining S2 a target recovery for the water purification based on the property indicative of the inlet water quality. Thus, the inlet water quality is used to determine the target recovery, thus, how much water that should be passed to drain, and how much should be recirculated. It should be understood that the target recovery is a target for the system recovery, and not the RO-membrane recovery. In some embodiments, the step of determining S2 a target recovery includes determining or estimating the inlet water quality based on one or more measurements of the inlet water conductivity, the feed water conductivity and/or the permeate water conductivity. The recovery adjusts how much of the contaminants and impurities that have been concentrated in the reject path 24 are being passed to drain 16. High recovery is used with good quality of the inlet water. With a lot of impurities more reject water needs to be passed to the drain 16. In some embodiments, the determining S2 comprising determining the target recovery with a limitation that a permeate water quality $C_{per}$ is maintained at a predetermined permeate water quality, or within a predetermined permeate water quality interval. This also presumes that there is a limitation on the feed water quality, that the feed water quality is maintained at a predetermined feed water quality, or within a predetermined feed water quality interval. Hence, the recovery is controlled such that the feed water quality is essentially maintained at a predetermined feed water quality, or within the interval. The recirculated reject water comprises concentrated water, and some should be passed to drain to not overconcentrate the water provided to the RO-unit 3. The greater the quality of the inlet water, the more of the reject water can be recirculated instead of being passed to drain. The target recovery is for example calculated using the following equation:

$$\text{target recovery} = 100 - \frac{\text{inlet water conductivity (in } \mu S/cm)}{X} \qquad (3)$$

The equation (3) is experimentally derived, and gives an estimate of a feasible target recovery for the current inlet water conductivity. The equation (3) relies on a linear relationship between the target recovery and the inlet water conductivity. The determining S2 thus comprises determining the target recovery based on a linear relationship between the target recovery and the inlet water conductivity. The equation (3) is designed to give the target recovery as a percentage value between 0 and 100. "0" means that all feed water is passed to drain. "100" means that all reject water is recirculated. The target recovery is for example allowed to vary between 50% and 90%. 50% means that 50% of the inlet water is sent to drain, and 90% means that only 10% of the inlet water is sent to drain. X is here a number determined based on an interval where the inlet water conductivity is allowed to vary. For example, the inlet water conductivity is allowed to vary between 100 μS/cm and 500 μS/cm. By having X=10, the target recovery can be varied between 50% and 90%, for an inlet conductivity varying between 100 μS/cm and 500 μS/cm.

The method also comprises controlling S3 a feed pump speed. In some embodiments, the controlling S3 comprises controlling the feed pump speed to a predetermined speed. Thus, the feed pump speed may be set to a constant, predetermined speed, or a predetermined speed within a predetermined interval. The constant, predetermined speed is for example a nominal speed of the feed pump 5. The predetermined interval is for example a nominal speed interval of the feed pump 5. The nominal speed or nominal speed interval of the speed pump 5 is for example a speed or speed interval, respectively, where it is known that the feed pump 5 is working most efficiently. If the feed pump speed is within its nominal speed interval, it is regarded as being operated at a nominal speed. However, in some situations, when the inlet water quality becomes too low, it is not possible to have the feed pump 5 at the nominal speed without passing (too) much reject water to drain. Also, as the pressure over the membrane should be increased to increase the permeate water quality, in some embodiment, the feed pump speed is increased to accomplish the increased pressure over the membrane. Thus, in some embodiments, the method comprises controlling S3 the feed pump speed to a speed determined based on a relation between the feed pump speed, the inlet water quality $C_{inlet}$ and a target permeate water quality $C_{per}$. For example, when the inlet water quality varies such that the target recovery cannot be maintained within the desired interval, the speed pump speed in changed to assist in delivering water with the target permeate water quality. In some embodiments, the relation between the feed pump speed, the inlet water quality $C_{inlet}$ and the target permeate water quality $C_{per}$ is a predetermined relation that gives a feed pump speed needed to produce permeate water with the target permeate quality, at the inlet water quality $C_{inlet}$ and the target recovery. For example, the relation is a linear relationship between the feed pump speed and the inlet water quality, that gives the target permeate quality for a predetermined constant recovery. This linear relationship is illustrated in the diagram in FIG. 5, which will be explained further below. The feed pump speed may thus be a dynamic feed pump speed, that is determined based on, inter alia, the inlet water quality.

The method also comprises measuring S4 a property indicative of a product water flow rate $Q_{prod}$, wherein the product water is permeate water that is delivered for consumption. The property is for example measured with the first flow rate sensor 11. The property is for example the flow rate of the product water in the permeate path downstream the recirculation point 10, thus, the product water flow rate $Q_{prod}$.

The method also comprises recirculating S5 a first portion of the reject water. The recirculation is performed to continually or continuously achieve a predetermined RO membrane-recovery. The RO membrane-recovery is the RO-recovery rate multiplied with 100, and thus gives the RO-recovery in percent. The RO-membrane recovery rate is the ratio of permeate flow rate to feed flow rate. The RO-membrane recovery rate is determined as how much of the feed water becomes permeate, thus, how much of the feed water that permeate across the RO-membrane 3a into the permeate path 22. The maximum recovery rate for the RO-membrane 3a is generally a design parameter that is set by the manufacturer of the RO-device. If the RO-membrane recovery is pushed beyond its design value, the reject water will become saturated with salts and scale will begin to form on the membrane surface, as some of the reject water is recirculated to the feed water. In order to avoid such situation, RO-membrane recovery is for example set to a, by the manufacturer, maximum recovery, e.g. between 15-25%, for example 20%, equal to a maximum recovery rate of 0.15-0.25. The RO-membrane recovery is typically continuously monitored and controlled. The predetermined recovery is for example set to the maximum recovery. Alternatively, the predetermined recovery ratio is allowed to vary within an interval, where the maximum recovery rate defines the upper limit of the interval. The recovery rate of the RO-membrane 3a may be calculated $$RO-\text{membrane recovery rate} = \frac{Q_{per}}{Q_{feed}},$$

where $Q_{per}$ is the permeate flow rate upstream the recirculation point 10, and $Q_{feed}$ is the feed flow rate. The feed flow rate $Q_{feed}$ is the rate of the feed water in the feed path 21, downstream any connection point of the recirculation path 25. In some embodiments, the recirculating S5 comprises measuring a permeate flow rate $Q_{per}$ of the permeate water. The permeate flow rate is for example measured with the permeate flow rate sensor 7. The recirculating S5 may also comprise providing an estimate of the feed flow rate $Q_{feed}$. The feed flow rate $Q_{feed}$ may be estimated from $Q_{feed}=Q_{per}+Q_{reject}=Q_{per}+Q_{re}+Q_{drain}$, where $Q_{re}$ is the flow rate of reject water that is recirculated ($Q_{re1}$ and $Q_{re2}$, if present), $Q_{re1}$ may be estimated from the speed of the recirculation pump, or is a known flow rate from the configuration of the valve (to a certain system pressure) in the first recirculation path 25 when the feed pump 5 is operated at a certain, e.g. nominal, speed. The drain valve arrangement 14 regulates $Q_{re2}$ to a constant, predetermined flow rate. When using a valve in the recirculation flow path, the values of $Q_{re1}$ and $Q_{re2}$, if any, are known to the control arrangement 30. $Q_{drain}$ is the flow rate of the reject water passed to drain, also referred to as drain water. $Q_{drain}$ may be estimated from the amount of time and/or degree the drain valve 13 is open to drain 16, as known to the skilled in the art. The recirculating S5 then comprises calculating the RO-membrane recovery rate, and controlling the recirculation to obtain the predetermined recovery rate. The recirculating S5 for example comprises using a feed-back controller, where the error between the calculated recovery and the desired, e.g. target, recovery is minimized. In case of the first embodiment in FIG. 1, the speed of the feed pump 5 is controlled to achieve the predetermined RO-membrane recovery. In case of the second embodiment, the speed of the recirculation pump is controlled to achieve the predetermined RO-membrane recovery. It has been found that the flow rate from respective pump may be estimated from the rate of the same pump, thus, the flow rate is proportional to the speed (e.g. rpm) of the pump, as the pump displacement is known. The flow rate from a pump may thus be determined from a mapping between the flow rate from the pump and the rpm of the same pump. Thus, the flow rate $Q_{feed\_pump}$ from the feed pump 5 may be estimated from the speed of the feed pump 5. The recirculation flow rate $Q_{re1}$ in the first recirculation path 25 may be estimated from the speed of the recirculation mechanism 15, e.g. a recirculation pump. The feed flow rate $Q_{feed}$ in the second embodiment in FIG. 2 may be estimated from the sum of the estimated recirculation flow rate $Q_{rec1}$ and the estimated flow rate $Q_{feed\_pump}$ from the feed pump 5. The speeds may be measured with embedded Hall-sensors in the motors of the pumps. Alternatively, the feed flow rate $Q_{feed}$ is measured with a feed flow rate sensor (not shown) arranged to measure the feed flow rate downstream the connection point of the recirculation path 25 in the feed path 21 (FIG. 2). Thus, the RO-membrane recovery rate may be calculated as $$\text{recovery rate} = \frac{Q_{per}}{Q_{feed}} = \frac{Q_{per}}{Q_{re1}+Q_{feed\_pump}}.$$

Thus, the speed of the recirculation pump is controlled such the predetermined RO-membrane recovery is maintained.

The method also comprises controlling S6 a drain flow rate $Q_{drain}$ to drain 16, from a second portion of the reject water, to accomplish the target recovery based on the product water flow rate $Q_{prod}$. Thus, a first portion of the reject water is recirculated in the first recirculation path 25, and a second portion is passed into the waste path 26. The total reject water is thus divided into the first portion and the second portion. The system recovery is determined based on how much water that is consumed when using the purification method. Thus, how much of the water that is input to the apparatus 1, that becomes product water (in percent). In other words, recovery is 100 multiplied with the recovery rate that is the ratio of product water flow rate to the inlet water flow rate. For the embodiments illustrated in FIGS. 1 and 2, the system recovery rate can be calculated as follows:

$$\text{recovery rate} = \frac{\text{Product water flow rate}}{\text{Inlet water flow rate}} = \frac{Q_{prod}}{(Q_{prod}+Q_{drain})}, \quad (4)$$

as the inlet water flow rate, thus, the flow rate of the incoming water to the apparatus 1, is equal to the flow rate of the water leaving the apparatus 1, thus the sum of the product water flow rate $Q_{prod}$ and the drain water flow rate $Q_{drain}$. From the equation (4), the drain flow rate $Q_{drain}$ can then be calculated as:

$$Q_{drain\_calc} = \frac{Q_{prod}}{\text{system recovery rate}} - Q_{prod}. \quad (5)$$

Thus, in some embodiments, the controlling S6 the drain flow rate $Q_{drain}$ comprises to calculate a target value $Q_{drain\_calc}$ of the drain flow rate $Q_{drain}$ based on the equation (5), using the property indicative of a product water flow rate $Q_{prod}$ determined in step S4, and the target recovery determined in step S2, as "recovery rate" in equation (5). The calculated target value $Q_{drain}$ talc is then used for controlling S6 the drain flow rate $Q_{drain}$ such that the drain flow rate $Q_{drain}$ is equal to the calculated target value $Q_{drain\_calc}$ of the drain flow rate. In other words, the controlling S6 comprises estimating a drain flow rate $Q_{drain}$ needed to accomplish the target recovery, based on the product water flow rate $Q_{prod}$, and controlling the drain flow rate to the estimated drain flow rate $Q_{drain}$.

In some embodiments, the method comprises a step S0 of estimating the drain flow rate $Q_{drain\_open}$ when the drain valve 13 is open. This estimate may then be used to determine an opening proportion, e.g. an opening degree or percentage, of the drain valve 13, needed to accomplish the target drain flow rate $Q_{drain}$. The opening proportion may be calculated by dividing the equation (5) with the drain flow rate $Q_{drain\_open}$ as follows:

$$\text{Opening proportion} = \frac{Q_{drain}}{Q_{drain\_open}} = \frac{\frac{Q_{prod}}{\text{system recovery rate}} - Q_{prod}}{Q_{drain\_open}} \quad (6)$$

In other words, the drain flow rate $Q_{drain\_open}$ when the drain valve 13 is open may be determined by estimating S0 a drain flow rate $Q_{drain\_open}$ through the drain valve 13 used for passing reject water to the drain 16, when the drain valve 13 is fully open to drain 16. Then, the controlling S6 comprises estimating an opening proportion the drain valve 13 should be open towards drain 16, based on the drain flow rate $Q_{drain}$ open and the estimated drain flow rate $Q_{drain}$, and controlling the drain valve 13 based on the estimated opening proportion. In one embodiment, the step S0 includes opening the drain valve 13 such that it is fully open to drain 16, closing the control device 19, closing the recirculation mechanism 15, and pumping water with the feed pump 5. The flow rate through the drain valve 13 may then be estimated by monitoring the water level in the tank 6 versus time. Alternatively, the flow rate through the drain valve 13 may be estimated by estimating the flow rate provided by the feed pump 5. The flow rate provided by the feed pump 5 should correspond to the flow rate through the drain valve 13.

In some embodiments, the method comprising re-circulating S7 a portion of the permeate water from a recirculation point 10 to the inlet water. The re-circulating S7 comprises to recirculate permeate water from the recirculation point 10 in the permeate path 22, to a point in the inlet path 20, typically located upstream the feed pump 5 but downstream the tank 6 and pretreatment module 2, if present. The portion of the permeate water that is recirculated is typically excess amounts of pretreated water that cannot be consumed. By recirculating the permeate water to the inlet path 20, the permeate water that is made in excess can be re-used. The inlet water is diluted with cleaner permeate water, thereby enhancing the purification. As the permeate water quality is controlled inter alia by changing the speed of the feed pump 5, the permeate flow rate may vary. By recirculating permeate, the product flow rate may be controlled to a target product flow rate. In some embodiments, the recirculating S7 comprises measuring a property indicative of the flow rate $Q_{prod}$ of a product water downstream the recirculation point 10 of the permeate water, and controlling the re-circulation in order to meet a product water flow rate criterion. The property indicative of the flow rate $Q_{prod}$ of the product water is for example the product flow rate $Q_{prod}$. The property is for example measured with the first flow rate sensor 11. The product water flow rate criterion includes for example that the product water flow rate is equal to, or close to equal to, a predetermined product water flow rate.

Figure 4:
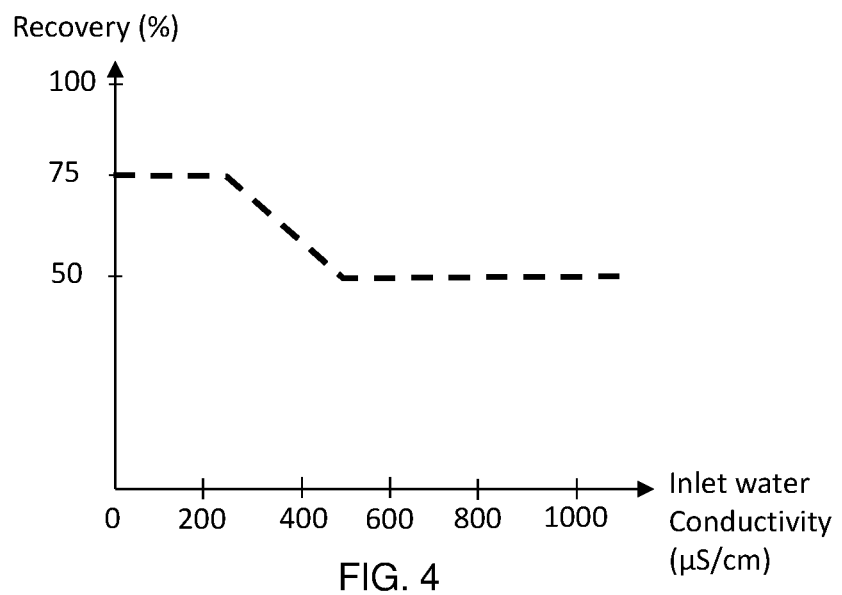
FIG. 4 is a first diagram illustrating recovery to inlet conductivity, according to some embodiments.
Figure 5:
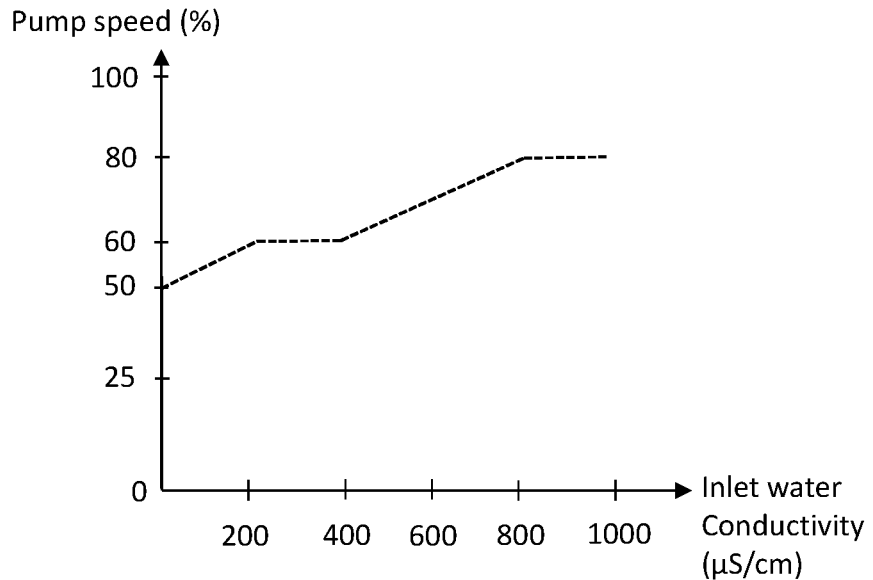
FIG. 5 is a second diagram illustrating feed pump speed to inlet conductivity, according to some embodiments.

FIGS. 4 and 5 are illustrating adaptive set-points for the system recovery and feed pump speed, to achieve a target recovery in a suitable range e.g. for pretreatment or consumption. The maximum conductivity on the inlet water is here 1000 μS/cm. FIG. 4 is a first diagram with recovery (in percent %) on the Y-axis, and inlet water conductivity (in μS/cm) on the X-axis. FIG. 5 is a second diagram with pump speed (in percent %) on the Y-axis, and inlet water conductivity (in μS/cm) on the X-axis. 100% is thus maximum speed. The system recovery is allowed to vary between 75% to 50%. When the inlet water conductivity is between 0 to 249 μS/cm, the recovery is maintained at a constant value of 75%. Turning to the second diagram in FIG. 5, at the same time, the feed pump speed is increased from 50% to 60%. Here 60% is the nominal speed of the feed pump 5. Thus, during a lower interval where the inlet conductivity is between 0 and 249 μS/cm, the feed pump speed is varied to cope for a varying inlet conductivity, while the recovery is maintained constant. This because the cost for operating the speed pump 5 in this lower interval is low, and the speed pump 5 is not yet on its nominal speed. Also, it is desired to save on water, and with a high recovery, more water can be saved. Thus, for high quality on inlet water, the feed pump speed is increased if the inlet conductivity is increased, while the recovery is maintained at a constant high level, during the control for achieving a target permeate water quality. Thereby water can be saved. The lower interval defines an interval for low values of inlet conductivity.

When the feed pump speed has reached a predetermined speed, e.g. a nominal speed, the controlling of the purification process goes into a middle interval of the inlet conductivity. During the middle interval, where the inlet conductivity here is between 250 μS/cm and 450 μS/cm, and the recovery is changed to cope for a varying inlet water quality, while the feed pump speed is maintained at a constant level of 60% of maximum speed. This because the feed pump 5 is working at its nominal rate, and thereby works most efficiently. This interval of the inlet conductivity may be referred to as a middle interval. The middle interval of the inlet conductivity is thus an interval that has higher values of the inlet conductivity than the middle interval but has lower values of the inlet conductivity than a later upper interval of the inlet conductivity. So, the recovery is changed in relation to a change in inlet conductivity, to continue produce permeate water to a target permeate conductivity, while the feed pump speed is kept constant, while the inlet conductivity is in the middle interval. The middle interval defines an interval for medium values of inlet conductivity.

When the recovery has been decreased to a predetermined lower limit value, here 50%, the controlling of the purification process goes into an upper interval of the inlet conductivity. In the upper interval, where the inlet conductivity is for example between 451 μS/cm and 600 μS/cm, the feed pump speed is changed to cope for a varying inlet conductivity is increased, while the recovery is maintained at the constant level of 50%. Thereby less water can be wasted, but the feed pump 5 must work harder and thus use more power, for increased inlet water conductivities. The upper interval defines an interval for high values of inlet conductivity.

Thus, the apparatus 1 can be controlled to different adaptive set-points for the feed pump speed and the recovery. The adaptive set-points are adapted based on the quality of the inlet water. Different thresholds for the quality (e.g. conductivity) of the inlet water determines the feed pump speed and the recovery of the apparatus 1. Thus, in the example above with reference to FIGS. 4 and 5, during the lower interval, the set point for the recovery is 75%. Thus, the determining S2 step here includes determining that the target recovery is 75%. The feed pump speed is controlled in accordance with controlling S3 the feed pump speed to a speed determined based on a relation between the feed pump speed, the property indicative of the inlet water quality $C_{inlet}$ and a target permeate water quality $C_{per}$. The lower interval is delimited by zero conductivity and a first threshold. Thus, as long as the conductivity of the inlet water is below the first threshold, the set point for the recovery is determined to be a predetermined first value, for example 75%. Further, the feed pump speed is controlled based on the relation.

During the middle interval, the determining S2 comprising determining a target recovery according to, for example, the equation (3). The middle interval is delimited by the first threshold and a second threshold. As long as the conductivity of the inlet water is on or above the first threshold and below or on the second threshold, the target recovery is calculated e.g. using the equation (3) or determined based on another linear relationship between the inlet water conductivity and the set recovery such that the set recovery is maintained at the middle interval. Generally, the recovery decreases as the inlet water conductivity increases. During the middle interval, the controlling S3 comprises controlling the feed pump speed to a set-point being a predetermined speed of 60% of the maximum speed, for example a nominal speed.

During the upper interval, the determining S2 includes determining the target recovery to be a predetermined second value, here 50%. The upper interval is delimited by the second threshold (and 1000 μS/cm or infinite conductivity).

As long as the conductivity of the inlet water is above the second threshold, the set point for the recovery is a predetermined second value, for example 50%. The predetermined second value is lower than the predetermined first value. During the upper interval, the feed pump speed is controlled in accordance with controlling S3 the feed pump speed to a speed determined based on a relation between the feed pump speed, the property indicative of the inlet water quality $C_{inlet}$ and a target permeate water quality $C_{per}$.

In other words, the controlling S3 of the feed pump comprises controlling the feed pump speed to a predetermined speed while the inlet water quality $C_{inlet}$ is within (at or on) a middle interval, here 250 μS/cm to 450 μS/cm. The middle interval includes the endpoints, here 250 μS/cm and 450 μS/cm, which also defines the first threshold and the second threshold, respectively. Also, the controlling S3 comprises controlling the feed pump speed based on the relation between the feed pump speed, the inlet water quality $C_{inlet}$ and a target permeate water quality $C_{per}$ while the inlet water quality $C_{inlet}$ is outside the middle interval. Thereby a fast and efficient control can be achieved.

The first threshold has a lower value than the value of the second threshold. These thresholds, which delimits the middle interval, may be determined based on characteristics of the RO-membrane 3a or certain characteristics of the inlet or feed water (hardness, specific ion concentrations and so on). Characteristics of the RO-membrane are, for example, mean pore size, size of membrane area, and capability of handling heat. The RO-membrane 3a is a semipermeable membrane. A RO-membrane typically has a mean pore size between 0.1 nanometer and 10 nanometers, depending on filter type. In some embodiments, the thresholds start as initial values that are determined based on the characteristics of the RO-membrane, for example given by the manufacturer. These thresholds may be updated to reflect changes to the RO-membrane such as wear and clogging. Such changes may be reflected by the resulting permeate water quality, which thus indicates the exchange of the current configuration of the apparatus 1. For example, if the target permeate water quality is not reached, the thresholds are adjusted such that the target permeate water quality is continuously reached while producing purified water. Thus, in some embodiments, the method comprises measuring a property indicative of a permeate water quality $C_{per}$, e.g. using the second quality sensor 8. The method further comprising evaluating whether the permeate water quality $C_{per}$ has achieved the target permeate water quality, and adjusting the thresholds, based on the evaluation, in order to make the permeate water quality $C_{per}$ accomplish the target permeate water quality $C_{per}$. Thus, if the evaluation reveals that the permeate water quality $C_{per}$, measured as a conductivity, is higher than the target permeate water quality, determined as a conductivity, one or more of the thresholds are adjusted such that the target permeate water quality is achieved. If the evaluation reveals that the permeate water quality $C_{per}$, measured as a conductivity, is lower or at the target permeate water quality, determined as a conductivity, the thresholds are not adjusted. Thus, the permeate water quality $C_{per}$ has then achieved the target permeate water quality. This procedure may include repeating the measuring, the evaluating and the adjusting of the thresholds several times, until the permeate water quality $C_{per}$ has then achieved the target permeate water quality. The procedure may be performed at regular intervals, depending on usage, for example once each time the apparatus 1 is used, once every week, once every month etc. As explained, the apparatus 1 comprises a control arrangement 30.

The control arrangement 30 is configured to perform the method according to any one of the embodiments herein automatically, when executed in the apparatus 1 according to the first or the second embodiment (FIGS. 1-2). In more detail, the control arrangement 30 is configured to obtain a property indicative of the inlet water quality $C_{inlet}$. The property is for example obtained from the first quality sensor 17. The control arrangement 30 is further configured to determine a target recovery for the water purification based on the property indicative of the inlet water quality. Thus, the target recovery may be determined by the control arrangement 30, as has been previously described. The control arrangement 30 is further configured to control the feed pump speed of the feed pump 5 to a predetermined speed, or to a speed determined based on a relation between the feed pump speed, the inlet water quality $C_{inlet}$ and a target permeate water quality $C_{per}$, based on the inlet water quality $C_{inlet}$. The control arrangement 30 is further configured to control the drain flow rate $Q_{drain}$ of the drain valve to drain, to accomplish the target recovery based on the product water flow rate $Q_{prod}$. In some embodiments, the predetermined speed is a nominal speed of the feed pump. The control of the feed pump speed may thus be dependent on the inlet water quality. For example, if the inlet water quality is within a, e.g. middle, interval of the inlet water quality, the feed pump speed is controlled to a predetermined speed, e.g. a nominal speed. If the inlet water quality is outside the middle interval, the feed pump speed is controlled based on the relation. The control arrangement 30 is further configured to estimate a drain flow rate $Q_{drain}$ needed to accomplish the target recovery, based on the product water flow rate $Q_{prod}$, and to control the drain flow rate to the estimated drain flow rate. The drain flow rate is controlled by means of a drain valve 13.

According to some embodiments, the control arrangement 30 is configured to determine the target recovery with a limitation that a permeate water quality $C_{per}$ is maintained at a predetermined permeate water quality, or within a predetermined permeate water quality interval.

According to some embodiments, the water purification apparatus 1 comprises a permeate recirculation path 23 arranged between a recirculation point 10 in the permeate path 22 and the inlet path 20, to re-circulate a portion of the permeate water from the recirculation point 10 to the inlet water.

According to some embodiments, the control arrangement 30 is configured to control the re-circulation in order to meet a product water flow rate criterion, based on the property indicative of a flow rate $Q_{prod}$ of a product water.

According to some embodiments, the relation between the feed pump speed, the inlet water quality $C_{inlet}$ and the target permeate water quality $C_{per}$ is a predetermined relation that gives a feed pump speed needed to produce permeate water with the target permeate quality, at the inlet water quality $C_{inlet}$ and the target recovery.

According to some embodiments, the control arrangement 30 is configured to control the feed pump speed to a predetermined constant speed while the inlet water quality $C_{inlet}$ is within a middle interval, and controlling the feed pump speed based on the relation between the feed pump speed, the inlet water quality $C_{inlet}$ and a target permeate water quality $C_{per}$ while the inlet water quality $C_{inlet}$ is outside the middle interval.

According to some embodiments, the quality sensor 9, 17 is a conductivity cell, and the property indicative of an inlet water quality $C_{inlet}$ is a conductivity of the inlet water, a conductivity of the feed water or a conductivity of the permeate water.

According to some embodiments, the control arrangement 30 is configured to estimate an initial drain flow rate $Q_{initial\_drain}$ through the drain valve 13 when the drain valve 13 is fully open towards drain 16, estimate a proportion the drain valve 13 should be open towards drain, based on the initial drain flow rate $Q_{initial\_drain}$ and the estimated drain flow rate $Q_{drain}$, and to control the drain valve 13 based on the estimated proportion.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the scope of the appended claims.

The invention claimed is:

1. A water purification apparatus configured to provide a stable permeate conductivity, the apparatus comprising:
    a fluid path;
    a feed pump configured to receive inlet water, and to provide feed water;
    a reverse osmosis membrane, wherein the reverse osmosis membrane is configured to receive feed water from the feed pump, and to produce permeate water and reject water;
    a quality sensor configured to measure an inlet water conductivity;
    a flow rate sensor configured to measure a product water flow rate, wherein the product water is permeate water that is delivered for consumption;
    a recirculation path configured to recirculate a first portion of the reject water to an inlet path or to a feed path;
    a drain valve configured to regulate a drain flow rate to a drain, from a second portion of the reject water; and
    a control arrangement configured to:
        receive, from the quality sensor, the inlet water conductivity;
        determine a target recovery for water purification based on the inlet water conductivity, wherein the target recovery defines a target ratio for product water flow rate to inlet water flow rate, wherein the inlet water flow rate is determined as the sum of product water flow rate and drain flow rate;
        control, based on the inlet water conductivity, a feed pump speed of the feed pump to either (i) a predetermined speed at which the feed pump works most efficiently, or (ii) a speed determined based on a relation between the feed pump speed, the inlet water conductivity and a target permeate water conductivity, and wherein the feed pump speed is controlled such that the target permeate water conductivity is achieved for the determined target recovery; and
        control the drain flow rate of the drain valve to drain, such that the target recovery is achieved based on the product water flow rate.

2. The water purification apparatus according to claim 1, wherein the control arrangement is configured to determine a drain flow rate needed to accomplish the target recovery, based on the product water flow rate, and to control the drain flow rate to be the determined drain flow rate.

3. The water purification apparatus according to claim 1, wherein the control arrangement is configured to determine the target recovery with a limitation that a permeate water conductivity is maintained at a predetermined permeate water conductivity, or within a predetermined permeate water conductivity interval.

4. The water purification apparatus according to claim 1, comprising a permeate recirculation path arranged between a recirculation point in the permeate path and the inlet path, such that the permeate recirculation path recirculates a portion of the permeate water from the recirculation point to the inlet path.

5. The water purification apparatus according to claim 4, wherein the control arrangement is configured to control recirculation so as to meet a product water flow rate criterion including that the product water flow rate is equal to, or close to equal to, a predetermined product water flow rate, based on the property indicative of a flow rate of a product water.

6. The water purification apparatus according to claim 1, wherein the relation between the feed pump speed, the inlet water conductivity and the target permeate water conductivity is a predetermined relation, and wherein an output of the predetermined relation is a feed pump speed needed to produce permeate water with the target permeate conductivity at the inlet water conductivity and the target recovery.

7. The water purification apparatus according to claim 1, wherein the control arrangement is configured to determine a target recovery,
    wherein the target recovery is determined to be a constant first value while the inlet water conductivity $C_{inlet}$ is in a lower interval,
    wherein the target recovery is determined according to a linear relationship between the target recovery and the inlet water conductivity while the inlet water conductivity $C_{inlet}$ is within a middle interval, and
    wherein the target recovery is determined to be a constant second value while the inlet water conductivity $C_{inlet}$ is in an upper interval, wherein the second value is lower than the first value, and wherein the target recovery in the middle interval is between the first value and the second value.

8. The water purification apparatus according to claim 1, wherein the quality sensor is a conductivity cell, and the conductivity indicative of an inlet water conductivity is a conductivity of the inlet water, conductivity of the feed water, or conductivity of the permeate water.

9. The water purification apparatus according to claim 1, wherein the control arrangement is configured to:
    determine an initial drain flow rate through the drain valve when the drain valve is fully open towards drain;
    determine a proportion the drain valve should be open towards drain, based on the initial drain flow rate and a determined flow rate; and
    control the drain valve based on the determined proportion.

10. A non-transitory, computer-readable medium storing instructions, which when executed by a processor of the control arrangement according to claim 1, cause the processor to:
    receive, from the quality sensor, the inlet water conductivity;
    determine a target recovery for the water purification based on the inlet water conductivity, wherein the target recovery defines a target ratio for product water flow rate to inlet water flow rate, wherein the inlet water flow rate is determined as the sum of product water flow rate and drain flow rate;
    control, based on the inlet water conductivity, the feed pump speed of the feed pump to either (i) a predetermined speed at which the feed pump works most efficiently, or (ii) a speed determined based on a relation between the feed pump speed, the inlet water conductivity and the target permeate water conductivity, and wherein the feed pump speed is controlled such that the target permeate water conductivity is achieved for the determined target recovery; and control the drain flow rate of the drain valve to drain, such that the target recovery is achieved based on the product water flow rate.

\* \* \* \* \*